United States Patent [19]
Hillman

[11] 3,899,268
[45] Aug. 12, 1975

[54] WIND-DRIVEN MOTIVE APPARATUS

[76] Inventor: Edwin K. Hillman, 907 W. Desert Cove, Phoenix, Ariz. 85029

[22] Filed: Feb. 11, 1974

[21] Appl. No.: 441,483

[52] U.S. Cl. .............................................. 416/117
[51] Int. Cl.² ............................................ F03D 3/06
[58] Field of Search ........................... 416/117–119

[56] References Cited
UNITED STATES PATENTS

| | | | |
|---|---|---|---|
| 148,927 | 3/1874 | Chapin | 416/83 |
| 928,097 | 7/1909 | Barker | 416/119 |
| 930,956 | 8/1909 | Gracey | 416/101 |
| 1,321,415 | 11/1919 | Brown | 416/10 X |
| 1,451,298 | 4/1923 | Greth | 416/10 X |
| 1,687,181 | 10/1928 | Prease | 415/2 |
| 2,129,652 | 9/1938 | Dean | 416/117 |
| 2,669,309 | 2/1954 | Akre | 416/111 |

FOREIGN PATENTS OR APPLICATIONS

| | | | |
|---|---|---|---|
| 864,768 | 5/1941 | France | 416/119 |
| 741,276 | 11/1943 | Germany | 416/10 |
| 623,361 | 12/1935 | Germany | 416/140 |
| 301,091 | 6/1930 | United Kingdom | 416/119 |

Primary Examiner—Everette A. Powell, Jr.

[57] ABSTRACT

Wind driven apparatus having pairs of vanes mounted upon a rotatable shaft is disclosed. Each of the vanes is laterally slidable upon the shaft to cyclically vary the surface area on either side of the shaft; however, the vanes are not rotatable with respect to the shaft. Rotation of the shaft, and attached power takeoff pulleys, is effected by the wind acting upon a greater surface area on one side of the shaft than the other.

10 Claims, 9 Drawing Figures

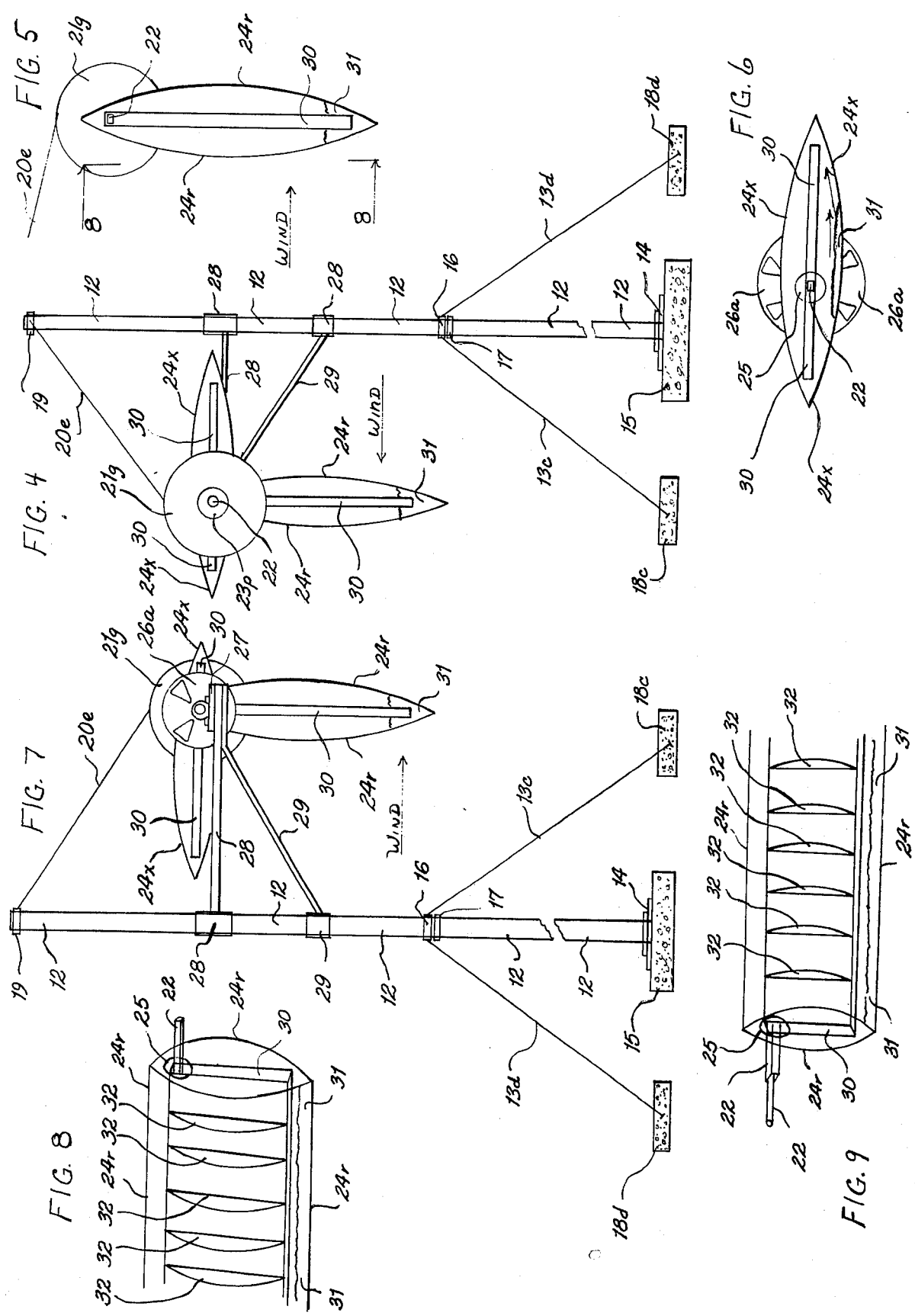

WIND-DRIVEN MOTIVE APPARATUS

The present invention relates to apparatus for harnessing the force of the wind, and more particularly, to apparatus for generating power by subjecting a constantly varying surface area to the force of the wind.

Various devices have been used for many years to harness the energy available from the wind. One of the most common of these devices is that of a fan-mounted upon a derrick, generally referred to as a windmill. Usually, the fan includes a rudder-like member for positioning the fan normal to the eye of the wind. The structure and configuration of the fan are such that it is primarily intended for low rotational speed operation. The low rotational speed and high torque output lends this type of apparatus to be particulrly suitable for connection to a reciprocating water pump. When so used, it is usually located at remote water holes for supplying water to cattle or other livestock. One of the primary disadvantages of this type of apparatus is that severe damage may occur to the fan or the operating mechanism during high wind conditions. Because of this disadvantage, the rudder-like mechanism is usually manually pivotable so as to align the fan with the wind and thereby prevent the wind from causing the fan to rotate. To be effective, the apparatus must, of course, be within easy access to the operator and such is not often the case at remote locations.

Another distinct type of wind-driven apparatus is that in which the operative element rotates on a vertical axis. Generally, this type of apparatus includes a plurality of arms extending in a horizontal plane. A cup-like shaped wind engaging device is secured to the extremity of each arm. The devices are similarly oriented at the extremities of the arms with the result being that of one-half of the apparatus presenting a greater resistance to the wind than the other half. The disparate resistance to the wind causes the wind to react more strongly on one half of the apparatus than the other. The unequal reaction, in turn, causes the apparatus to rotate about its vertical axis. A typical example of this type of device is a wind speed measuring device known as an anemometer.

Variations on the above discussed types of wind-driven apparati have also been developed. One of the most notable developments is that of a device functioning similarly to an anemometer but having its arms either curved or dished whereby the wind coacts with one half of the apparatus with greater force than the other half. However, each of these types of apparatus include non-varying surface area elements extending from a hub, whether that hub be in the vertical or horizontal axis.

It is therefore a primary object of my invention to provide a means for generating power by presenting a variable surface area to the wind.

Another object of my invention is to provide a means for varying the area of the surfaces subjected to the force of the wind as a function of the rotational position of the surfaces.

Yet another object of my present invention is to provide a means for orientating a wind motivated power generator with respect to the eye of the wind.

Still another object of my invention is to provide a wind operated power generator having a plurality of vanes rotatable about a horizontal shaft.

A further object of my invention is to provide a wind operated power generator having a plurality of vanes rotatable about a horizontal shaft and translatable lateral to the shaft.

A yet further object of my invention is to provide a wind operated power generator having a plurality of vanes rotatable and laterally positionable about a common shaft in response to a shiftable fluid disposed in each vane.

A still further object of my invention is to provide a plurality of vanes for a wind operated power generator, which vanes pivot and translate about a common shaft in response to a combination of forces produced by the wind and a change in center of gravity of the vanes.

These and other objects of the invention will become more readily apparent to those skilled in the art as the description thereof proceeds.

The present invention may be described with greater specificity and clarity with reference to the following drawings, in which:

FIG. 4 is an end view of my invention taken along lines 4—4, as shown in FIG. 1;

FIG. 5 is a side view of a part of my invention taken along lines 5—5, as shown in FIG. 1;

FIG. 6 is a side view of another part of my invention taken along lines 6—6, as shown in FIG. 2;

FIG. 7 is an end view of my present invention taken along lines 7—7, as shown in FIG. 2;

FIG. 8 is an internal view of one of the vanes taken along lines 8—8, as shown in FIG. 5;

FIG. 9 is an internal view of another of the vanes taken along lines 9—9, as shown in FIG. 1.

Figure 1:
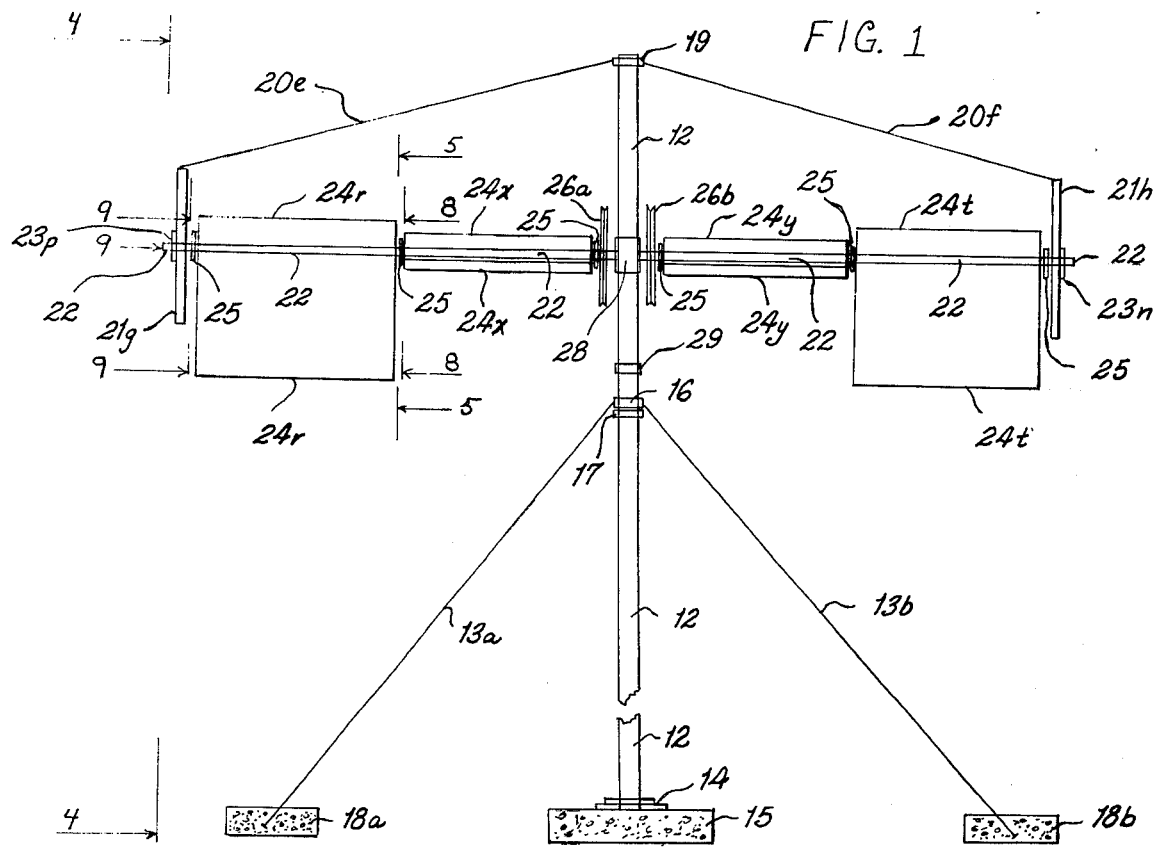
FIG. 1 illustrates a front view of my invention.

In the following discussion describing the present invention, reference will be made to FIG. 1. Cross-sectional view of the present invention illustrates the wind-driven motive apparatus placed in the path of the wind. Mast 12 is supported in an upright position by cable 13a and cable 13b. The base of mast 12 is secured to bearing 14 and bearing 14 is secured to concrete 15. Cable 13a and cable 13b is fixed to sleeve 16 which is a snug fit around mast 12. Collar 17 is fixed to mast 12 below sleeve 16 to prevent sleeve 16 from moving downward on mast 12. The ground portion of cable 13a and cable 13b is secured to concrete 18a and concrete 18b. Collar 19 is secured to mast 12 at its topmost position and cable 20e and cable 20f are secured to collar 19. Vane 21g and vane 21h are secured to square bar shaft 22 by the use of bearing 23n and bearing 23p. Vane 24r and vane 24t are set at right angles with respect to vane 24x and vane 24y on square bar shaft 22. Washers 25 are used to separate the vanes from each other and from vane 21g and vane 21h and also from pulley 26a and pulley 26b. In this FIG. 1 vane 24r and vane 24t are subject to the force of the wind and will pivot about square bar shaft 22 causing pulley 26a and pulley 26b to rotate with square bar shaft 22.

Figure 2:
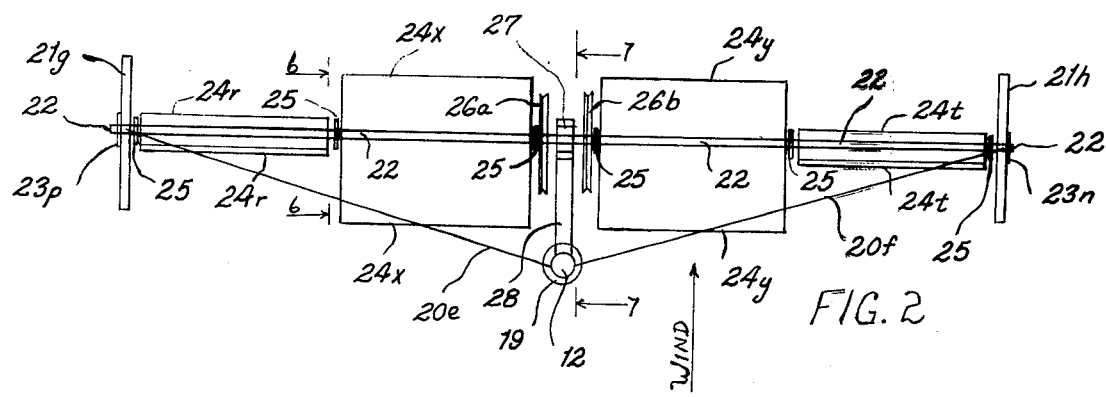
FIG. 2 illustrates a top view of my invention in one operative mode.

Further discussion and referring to FIG. 2, square bar shaft 22 is machined down at midpoint to accept a split bearing 27. Split bearing 27 is mounted on support 28. Cable 20e and cable 20f provides tension to vane 21g and vane 21h from collar 19.

Figure 3:
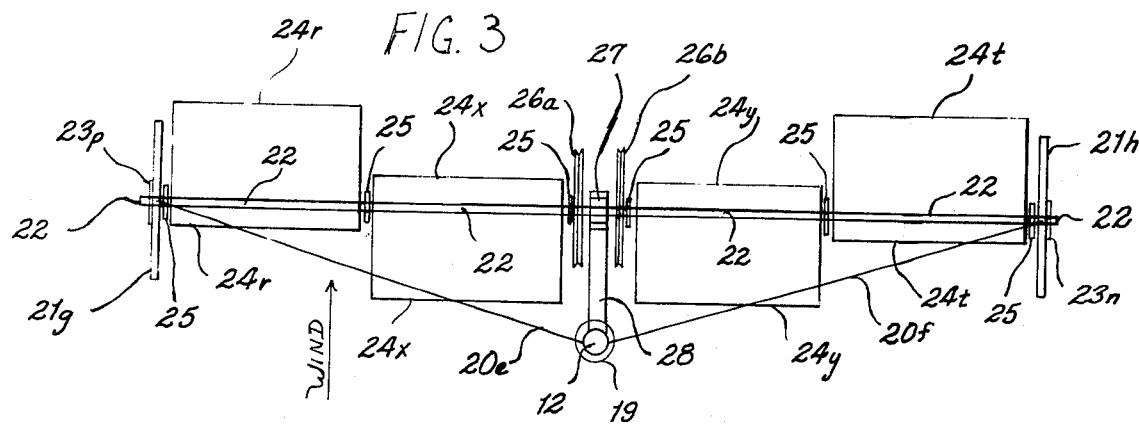
FIG. 3 illustrates a top view of my invention in another operation mode.

FIG. 3 also shows a top view of FIG. 1 but in this figure vane 24x and vane 24y have "slid" into a working mode by reason that the force of the wind has acted upon vane 24r and vane 24t and caused square bar shaft 22 to rotate. At this moment as seen in FIG. 3 all the vanes 24r, 24x, 24y and 24t are contributing to the rotation of square bar shaft 22.

Further discussion and with reference to FIG. 4 of the present invention, support 29 is needed to augment the support 28 in stabilizing the entire apparatus from wind gusts. Cable 13c and cable 13d are also needed to orient mast 12 in an upright position. The ground level of cable 13c and cable 13d are secured into concrete 18c and concrete 18d.

Further discussion and with reference to FIG. 5, shows slot 30 and slot 30 is common to vane 24r, vane 24t, vane 24x and vane 24y. Fluid 31 with an antifoaming agent added is shown collected in the lower portion of vane 24r when vane 24r is in the working mode. This FIG. 5 shows the effect of square bar shaft 22 of being turned because of slot 30 being made to conform to that shape. Fluid 31 is contained and within each vane 24r, vane 24t, vane 24x and 24y.

Further discussion and referring to FIG. 6, shows the movement of fluid 31 as shown by the arrow to help this vane 24x "slide" on square bar shaft 22 at an earlier stage than would be normal.

Further discussion and referring to FIG. 7 in the present invention, support 29 is secured to support 28 and split bearing 27 is mounted on this combination. Pulley 26a is one of the two pulleys available for the power output of the present invention.

Further discussion and referring to FIG. 8 shows the ribs 32 that are needed to form the convex form of vane 24r. Fluid 31 is able to flow between ribs 32 to reach the opposite edge of its own respective vane when that respective vane reaches the point in its rotation and sliding on square bar shaft 22 to warrant the flow of fluid 31, being aided by the force of gravity, to quickly flow from one edge of their respective vane edges to their own opposite edge.

Further discussion and referring to FIG. 9, shows the ribs 32 structure to form the convex form of vane 24r, the base of ribs 32 fixed to slot 30. The end of square bar shaft 22 is shown to be turned down to accept a bearing that is used in the present invention. Vane 24r, vane 24t, vane 24x and vane 24y are each constructed to have its own slot 30, its own ribs 32 and its own fluid 31 and to be shaped in a convex form as shown in the various Figures. Slot 30 extends through the entire length and width of each respective vane mentioned and as shown in the various Figures.

In discussing the present invention it is assumed the wind will blow in the direction of the arrows in the various Figures. In FIG. 1 it is to be noted that the use of a square bar shaft 22 makes it possible to mount vane 24r at right angles with respect to vane 24x and also to mount 24t at right angles with respect to vane 24y. In FIG. 1 the working vanes are vane 24r and 24t. Vane 24x and 24y are now in a position to be able to slide on square bar shaft 22 toward its working position to engage the wind. FIG. 6 shows the movement of fluid 31 to aid vane 24x in reaching this position of a working vane because fluid 31 can move within the confines of vane 24x and move faster because fluid 31 can react to the force of gravity than vane 24x by itself could react to the forces of gravity because it must slide on square bar shaft 22 and would have to reach a greater inclination if the presence of fluid 31 were not present. The force of the wind is also a contributing factor to the sliding movement of vane 24r, vane 24x, vane 24y and vane 24t on square bar shaft 22.

The force of the wind on vane 24r and vane 24t cause square bar shaft 22 to rotate in split bearing 27 and in bearing 23n and bearing 23p. Vane 21g and vane 21h have bearing 23p and bearing 23n secured to the center area of vane 21g and vane 21h can be the circular shape as shown in the various Figures but vane 21g and vane 21h can be of a different shape. Vane 21g and vane 21h acts as direction vanes in respect to the eye of the wind and cause mast 12 to rotate in sleeve 16 and also bearing 14, which bearing 14 is secured to concrete 15. Cable 20e and cable 20f provide the tension from collar 19 to vane 21g and vane 21h and cable 20e and cable 20f is fixed to the top area of vane 21g and vane 21h to stabilize the apparatus. Cable 13a, cable 13b, cable 13c and cable 13d keep mast 12 in an upright position. Concrete 18a, concrete 18b, concrete 18c and concrete 18d anchor cable 13a, cable 13b, cable 13c and cable 13d at ground level and provide tension to sleeve 16. Collar 17 is needed to position sleeve 16 around mast 12.

Support 28 and support 29 extend the power producing apparatus from mast 12 to better co-act with the wind as shown in the various Figures. Ribs 32 help form the convex form of the individual vanes, vane 24r, vane 24x, vane 24y and vane 24t. Fluid 31 is able to reciprocate and flow from one edge of the vanes to its own respective opposite edge. The movement of fluid will take place between ribs 32 and will move in accordance with the inclination of any particular working vane at that time and moment. Slot 30 enables the working vanes to slide on square bar shaft 22 and regain its working mode of operation into the force of the wind. Washers 25 placed between the vanes and pulleys are needed to reduce the friction that would occur if the vanes were to move against each other.

Pulley 26a and pulley 26b which can be adapted to fit square bar shaft 22 provides the power take-off function of the wind-driven motive apparatus. The rotation of square bar shaft 22 causes the rotation of pulley 26a and pulley 26b.

Further discussing the present invention, the wind-driven motive apparatus described has the inherent ability to self-regulate itself due to the movement of the working vanes. In the event of a high wind condition the working vanes try to pivot and rotate about square bar shaft 22 in accordance to the increased velocity of the wind, but in this condition the working vanes do not have time to regain their sliding movement into the force of the wind due to the centrifugal force that is imposed on the working vanes and present their varying surfaces to the force of the wind in a blocking action. This inherent ability for self-regulation would become apparent in observation of the wind-driven motive apparatus in actual operation.

The inherent self-regulation is also enhanced by fluid 31 which in the event of a high wind condition further gives the centrifugal force an added emphasis.

It is to be noted that in describing the present invention that vane 24r, vane 24x, vane 24y and vane 24t operate in a similar fashion at their own particular moment as described to accomplish a combined effort to rotate square bar shaft 22.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

Having thus completely and fully described the invention what is now claimed is as follows:

1. Apparatus responsive to the force of the wind for generating power, said apparatus comprising in combination:
   a. a plurality of vanes for rotatably responding to the force of the wind;
   b. a horizontally oriented shaft for supporting said plurality of vanes;
   c. key means for maintaining a non-rotatable relationship intermediate said plurality of vanes and said shaft such that rotation of said plurality of vanes in response to the force of the wind produces a commensurate rotation of said shaft;
   d. slot means disposed within each of said plurality of vanes for engaging said shaft, said slot means accommodating downward sliding movement of each of said plurality of vanes in response to the force of gravity to periodically laterally reposition each of said plurality of vanes as said plurality of vanes and said shaft rotate such that each of said plurality of vanes presents a greater surface area to the force of the wind below said shaft than above said shaft;
   e. a power takeoff pulley attached to said shaft for transmitting power to a power consuming element; and
   f. mast means for supporting said shaft and said plurality of vanes in the wind; whereby, the disparate surface area above and below said shaft which is presented to the prevailing wind by the sliding action of said plurality of vanes induces rotation of said shaft and said power takeoff pulley.

2. The apparatus as set forth in claim 1 including a chamber disposed in each of said plurality of vanes and fluid means disposed within and only partially filling each of said chambers for aiding the sliding movement of said plurality of vanes; whereby, said fluid means will flow cyclically to the lower lateral edge of each of said chambers to provide a greater mass upon which the force of gravity can act and enhance sliding movement of each of said plurality of vanes.

3. The apparatus as set forth in claim 2 wherein said key means comprises a rectangular cross-section for said shaft and a rectangular slot sized to inhibit rotation of said shaft within said slot but accommodate sliding motion therebetween.

4. The apparatus as set forth in claim 3 wherein the cross-section of said shaft is square.

5. The apparatus as set forth in claim 1 wherein said mast means comprises an upwardly directed mast, pivot means for pivoting said mast about its longitudinal axis and support means for supporting said shaft.

6. The apparatus as set forth in claim 5 wherein said support means comprises a laterally extending support and bearing means disposed at the extremity of said support for rotatably supporting said shaft.

7. The apparatus as set forth in claim 6 including vane means for orienting said shaft normal to the eye of the wind.

8. The apparatus as set forth in claim 5 wherein an equal number of said plurality of vanes are mounted on said shaft on each side of said support means.

9. The apparatus as set forth in claim 8 wherein said plurality of vanes comprise pairs of vanes, one of each said pair of vanes being mounted on each side of said support and in general alignment with one another.

10. The apparatus as set forth in claim 9 wherein said pairs of vanes comprise two pairs of vanes, one of said two pairs of vanes being aligned normal to the other of said two pairs of vanes.

* * * * *